US010917435B2

(12) United States Patent
Stupak et al.

(10) Patent No.: US 10,917,435 B2
(45) Date of Patent: Feb. 9, 2021

(54) CLOUD AI ENGINE FOR MALWARE ANALYSIS AND ATTACK PREDICTION

(71) Applicant: Acronis International GmbH, Schaffhausen (CH)

(72) Inventors: Anatoly Stupak, Moscow (RU); Vladimir Strogov, Moscow (RU); Alexey Dod, Moscow (RU); Serguei Beloussov, Costa del Sol (SG); Valeriy Chernyakovskiy, Moscow (RU); Alexey Kostyushko, Moscow (RU); Stanislav Protasov, Moscow (RU)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 162 days.

(21) Appl. No.: 15/998,856

(22) Filed: Aug. 17, 2018

(65) Prior Publication Data

US 2019/0058736 A1 Feb. 21, 2019

Related U.S. Application Data

(60) Provisional application No. 62/546,706, filed on Aug. 17, 2017.

(51) Int. Cl.
*H04L 29/06* (2006.01)
*G06F 21/56* (2013.01)
*G06F 21/55* (2013.01)
*G06N 5/02* (2006.01)

(52) U.S. Cl.
CPC .............. *H04L 63/20* (2013.01); *G06F 21/55* (2013.01); *G06F 21/554* (2013.01); *G06F 21/562* (2013.01); *G06N 5/02* (2013.01); *H04L 63/145* (2013.01); *H04L 63/1425* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 9,241,010 B1 * | 1/2016 | Bennett | H04L 63/1433 |
| 9,332,028 B2 * | 5/2016 | Xaypanya | H04L 63/145 |
| 9,356,942 B1 * | 5/2016 | Joffe | H04L 63/1408 |
| 9,654,485 B1 * | 5/2017 | Neumann | H04L 63/1416 |
| 2015/0326588 A1 * | 11/2015 | Vissamsetty | H04L 63/1491 |
| | | | 726/23 |

(Continued)

*Primary Examiner* — Brandon S Hoffman
(74) *Attorney, Agent, or Firm* — Arent Fox LLP; Michael Fainberg

(57) ABSTRACT

Methods and systems are disclosed herein for detecting malicious software executing on a plurality of computing devices. In an exemplary aspect, a method comprises collecting, from a plurality of agents executing on a respective computing device, analysis data corresponding to executables on the respective computing device, determining a suspicious activity pattern based on the received analysis data, determining that at least one executable on a computing device is malware based on the determined suspicious activity pattern, generating a plurality of remedial actions for protecting respective computing devices of the plurality of agents based on the suspicious activity pattern, and distributing, to the plurality of agents, the plurality of remedial actions to protect the respective computing device from the malware.

17 Claims, 4 Drawing Sheets

(56) References Cited

U.S. PATENT DOCUMENTS

2016/0224790 A1* 8/2016 Gupta .................... G06F 21/52
2016/0261482 A1* 9/2016 Mixer .................... H04L 63/00
2016/0321452 A1* 11/2016 Richardson ....... H04W 12/1208

* cited by examiner

CLOUD AI ENGINE FOR MALWARE ANALYSIS AND ATTACK PREDICTION

CROSS-REFERENCE TO RELATED APPLICATIONS

The present application claims the benefit of U.S. Provisional Application No. 62/546,706 filed on Aug. 17, 2017, which is herein incorporated by reference in its entirety.

FIELD OF TECHNOLOGY

The present disclosure relates generally to the field of computer security, more specifically, to a system for a cloud-based artificial intelligence (AI) engine for malware analysis and attack prediction.

BACKGROUND

Malicious software, also referred to as "malware," can infiltrate or damage a computer system by corrupting software code, resulting in abnormal operation or even termination of applications and the operating system. A large amount of new malware binaries are produced and redistributed on a daily basis. Malware that exploits undisclosed software flaws or vulnerabilities that are unknown even to a software provider (and therefore before the software provider has an opportunity to create a patch that fixes the vulnerability) are becoming increasingly common. So-called "zero-day" attacks and exploits are therefore undetectable by security applications and antivirus protection, and must be investigated manually. This investigation process can be limited by the number and qualification of security analysts and by the (small) amount of information available regarding the malware, such as a malware sample or a portion of a malware sample.

Furthermore, conventional malware detection techniques have several drawbacks. Static analysis techniques involve scanning software code to identify suspicious commands and to compare the code with known characteristic properties of other viruses from an antivirus database. However, static analysis may be ineffective in situations where the active malware has been significantly modified or obfuscated from previous known versions, or in situations where the active malware has not been previously analyzed or even seen before, as is the case with zero-day attacks. Dynamic analysis techniques involve executing suspicious software code in a monitored, virtual environment, such as in a virtual machine. However, dynamic analysis techniques may be vulnerable to anti-emulation tricks embedded in the malware specifically designed to thwart analysis in the virtual environment. Examples of such anti-emulation tricks include the use of undocumented or uncommon Application Programming Interfaces (APIs), or the loading of a library for the operating system that is not emulated, that generally result in the failure of the emulator (e.g., virtual machine).

SUMMARY

The present disclosure provides an effective solution for the foregoing problems of conventional techniques for detecting malware. Disclosed are example systems, methods and computer program products for detecting malicious software executing on a plurality of computing devices.

In one aspect, an exemplary method is disclosed for detecting malicious software executing on a plurality of computing devices. According to this aspect, the method comprises collecting, from a plurality of agents executing on a respective computing device, analysis data corresponding to executables on the respective computing device, determining a suspicious activity pattern based on the received analysis data, determining that at least one executable on a computing device is malware based on the determined suspicious activity pattern, generating a plurality of remedial actions for protecting respective computing devices of the plurality of agents based on the suspicious activity pattern, and distributing, to the plurality of agents, the plurality of remedial actions to protect the respective computing device from the malware.

According to another aspect, the suspicious activity pattern based on the received analysis data further comprises identifying malware authors based on behavioral and distribution patterns.

According to another aspect, determining the suspicious activity pattern based on the received analysis data further comprises detecting a malware epidemic based on previously known distribution methods.

According to another aspect, determining the suspicious activity pattern based on the received analysis data further comprises detecting a security flaw in a user application that can be used for malware based on previously known distribution methods.

According to another aspect, the received analysis data comprises static analysis of at least one executable and dynamic analysis of the at least one executable.

According to another aspect, determining that at least one executable on the computing device is malware based on the determined suspicious activity pattern further comprises identifying a zero-day attack by malware not found in a database of previously known malware based on the suspicious activity pattern.

According to another aspect, the method further comprises identifying a zero-day attack by malware by determining the malware is modified from a previously known version on the malware based on the suspicious activity pattern and using a database of previously known malware, determining a known remedial action for the previously known version from the database, the known remedial action comprising one or more commands and distributing the known remedial action to the plurality of agents for execution of the one or more commands on the plurality of computing devices.

According to another aspect, a system is provided for detecting malicious software executing on a plurality of computing devices. In this aspect, the system comprises a database for storing information associated with previously-known malware; and a processor configured to: collect, from a plurality of agents executing on a respective computing device, analysis data corresponding to executables on the respective computing device, determine a suspicious activity pattern based on the received analysis data, determine that at least one executable on a computing device is malware based on the determined suspicious activity pattern, generate a plurality of remedial actions for protecting respective computing devices of the plurality of agents based on the suspicious activity pattern, and distribute, to the plurality of agents, one or more commands to protect the respective computing device from the malware.

According to another aspect, a non-transitory computer readable medium storing computer executable instructions is provided for detecting malicious software executing on a plurality of computing devices. In this aspect, the instructions comprise collecting, from a plurality of agents executing on a respective computing device, analysis data corresponding to executables on the respective computing device, determining a suspicious activity pattern based on the received analysis data, determining that at least one executable on a computing device is malware based on the determined suspicious activity pattern, generating a plurality of remedial actions for protecting respective computing devices of the plurality of agents based on the suspicious activity pattern, and distributing, to the plurality of agents, the plurality of remedial actions to protect the respective computing device from the malware.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for detecting malicious software executing on a plurality of computing devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Aspects of the present disclosure provide a cloud-based AI-powered engine that can improve the accuracy, responsiveness, and efficiency of malware activity investigations, as well as provide useful information which cannot be retrieved with human analysis. The described system collects different data on suspicious activity on a large volume of client machines (e.g., worldwide, within a corporate wide and/or local area network, or the like), stores and analyzes the data to define and react early to dangerous viral attacks. As described in greater detail below, analysis of the collected data can train the cloud-based AI engine to detect early, predict and prevent malware epidemics, predict and help to find critical exploits, and possibly help to identify and find malware authors and distributors.

Previously known methods of dynamic analysis performed on the client side are severely limited by client side resources. Large databases of known bad behavior patterns are difficult or impossible to download at the client machine. Further, building and executing the complex AI models on client machine greatly impacts system performance. Exemplary aspects of the present disclosure include performing preprocessing to extract key suspicious actions (in some aspects a local AI model is also incorporated). The extracted actions are reported to one or more cloud AI services to investigate and decide whether the actions are representative of malware, a vulnerability or the like and perform or suggest required actions to prevent further distribution of the detected malware through the detected vulnerability.

Figure 1:
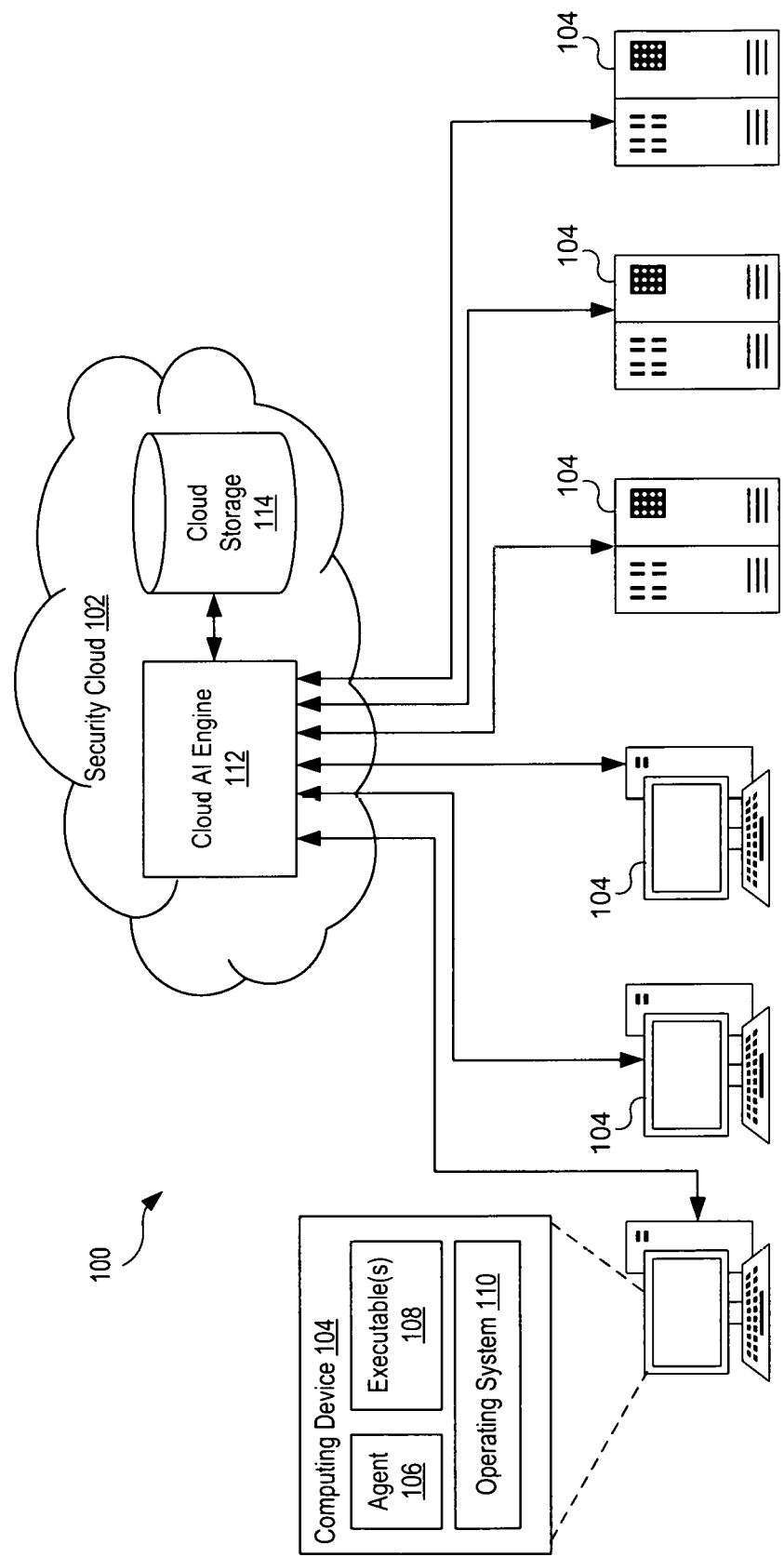
FIG. 1 is a block diagram illustrating a system for detecting malicious software executing on a plurality of computing devices according to an exemplary aspect.

FIG. 1 is a block diagram illustrating a system 100 for detecting malicious software executing on a plurality of computing devices according to an exemplary aspect. The system 100 includes a plurality of computing devices 104 communicatively connected to a security cloud (alternatively referred to as security cloud service) 102 by a network (e.g., the Internet). The plurality of computing devices 104 may include one or more servers and client devices, such as desktops, laptops, mobile devices, which may be geographically distributed and in different networks.

As shown in FIG. 1, each computing device 104 may include one or more executables 108 installed and/or executing in an operating system (OS) environment provided by an operating system 110. Each computing device 104 further includes a security agent 106, which is a software application or module installed on the computing device 104 to collect and send information to the security cloud service 102.

The security agent 106 may be configured to perform static analysis on the executables 108 and other software installed on the computing devices 104. In one aspect, the security agent 106 may analyze the software code of the executables 108 in search of any combination of known malware characteristics, including combinations of library imports from suspicious modules, certain binary code patterns typical among malware (e.g., cryptography), certain code patterns in the case of scripts or decompilable bytecode typically found in malware, and suspicious payloads. The security agent 106 may also statically analyze the executables 108 for the presence of fake resources or digital signatures. For example, the security agent 106 may be configured to detect when an executable 108 is signed with an invalid, self-made, or untrusted certificate. In another example, the security agent 106 may detect if an executable 108 purports to be made by a known party (e.g., Microsoft®) according to the executable's resources, but does not have the valid Microsoft signature. In performing the analysis, the security agent 106 may use a local database (not shown) installed and stored on the computing device 104, which contains a library of known file contents or characteristic properties values of files (e.g., hashes, CRCs, etc.) associated with known malware. In other aspects of the disclosure, the local database is not stored in the computing device 104, but is accessible from a device on the local network, to which the computing device 104 is connected.

In one aspect, the security agent 106 may also be configured to perform a dynamic analysis on the executables 108 running on the computing devices 104. It is noted that, by using live data from a plurality of agents within a local or wide area network, worldwide, or the like, aspects of the present disclosure are able to provide dynamic analysis of executables without needing to use a virtual environment (e.g., virtual machine), which can be vulnerable to anti-emulation techniques, as described earlier. In one aspect, the security agent 106 may observe and analyze the execution of an executable for file distribution patterns, for example, for scenarios in which the executable is launched from an email attachment, unpacked from another executable, downloaded from the network, downloaded from a file share, or downloaded from an external drive. In another aspect, the security agent 106 may analyze the execution of an executable (e.g., executable 108) for certain behavioral patterns associated with malware, such as access to a "kill-switch" (e.g., some randomly generated domain name), suspicious file activity (e.g., encrypting files, corrupting registry), and suspicious network activity. In some aspects, the security agent 106 may analyze an executable for suspicious process or thread activity (e.g., unpacking and running executables, injection into system processes) or suspicious scripting activity (e.g., unpacking and running scripts in batch, Python, VBScript, PowerShell). The security agent 106 collects such information about suspicious activities and sends them to the security cloud service 102.

According to an exemplary aspect, suspicious file activity may comprise one or more of:
Mass file encryption,
Mass file deletion,
System files modification or replacement,
Change or corruption of system configuration,
Access and modification of non-typical files from non-typical applications (e.g. changing user files by calculator or web browser changing another application files),
Editing files by the application in a non-typical way (Some applications typically create temporary files for crash consistency. Non-usage of these files and direct modification of user files can be suspicious)

While the above presents some examples of suspicious file activity, suspicious file activity is not limited thereto. In some aspects, there may be a database of suspicious file activity that is actively updated to include newly identified suspicious behavior, in some aspects based on machine learning of the cloud AI.

According to an exemplary aspect, suspicious network activity may comprise one or more of:
Accessing network domains and addresses which were previously detected as suspicious by disclosed or other software,
Network activity from an application which does not typically perform network activity,
Network activity by an application using non-typical protocols and addresses (e.g. downloading files from a calculator or torrent tracker inside a tables editor such as Microsoft Excel, or the like)

While the above presents some examples of suspicious network activity, suspicious network activity is not limited thereto. In some aspects, there may be a database of suspicious network activity that is actively updated to include newly identified suspicious behavior, in some aspects based on machine learning of the cloud AI engine 112.

In one aspect, the security cloud 102 includes a cloud artificial intelligence (AI) engine 112 communicatively connected to a cloud storage 114. In general, the security cloud 102 is configured to collect and analyze the information received from the computing devices 104. The security cloud 102 may define and group suspicious activity patterns by (i) static patterns, (ii) distribution patterns, and (iii) behavioral patterns. The cloud storage 114 may be configured to store the voluminous amounts of data collected from the many computing devices 104. Using the collected data, in one aspect the cloud storage 114 may provide both a detailed historical record of past behavior in each of the computing devices 104, as well as aggregated statistics representing the behavior of the computing devices 104.

The cloud AI engine 112 may be configured to analyze all incoming data and performs a number of investigations and predictions based on the incoming data. The cloud AI engine 112 may use analyzed code, behavioral patterns, and distribution patterns to identify likely malware authors or responsible parties, as well as to collect AI models to improve malware detection for zero-day attacks. The cloud AI engine 112 may further detect and predict malware epidemics based on an analysis of distribution methods. The cloud-based AI engine 112 may further analyze and detect possible security holes in third-party software that can be exploited by malware epidemics based on analyzed distribution methods. In one exemplary aspect, agents executing on client devices may collect information about how malware appears in the devices, including call stacks, for example. In this aspect, the cloud AI engine 112 may determine that there is a security hole in some particular application or protocol based on the collected information. The cloud AI engine 112 may subsequently notify users, system administrators, or other parties about this security hole.

In exemplary aspects, the cloud AI engine 112 may be trained to learn that particular distribution patterns have malware authors. For example, an agent of the cloud AI engine 112 may monitor file and network activity and may determine how, through which protocols and applications each file has appeared on the system. The agent and the cloud AI engine 112 may decide whether the file which ultimately appeared on the system is malicious. The cloud AI engine 112 saves and analyzes the modification of the files and the distribution chains for these files to determine typical patterns of how malicious files typically appear in the system. In some instances, the cloud AI engine 112 performs a "guess" that some malware writers have typical patterns which are non-standard behaviors for methods of doing typical things, similar to how real-world criminals operate. For example, a malware author can be found to generally perform code injection with a particular non-typical method, which is then recognized in other malware. This pattern can act as a signature for a particular malware author.

Figure 2:
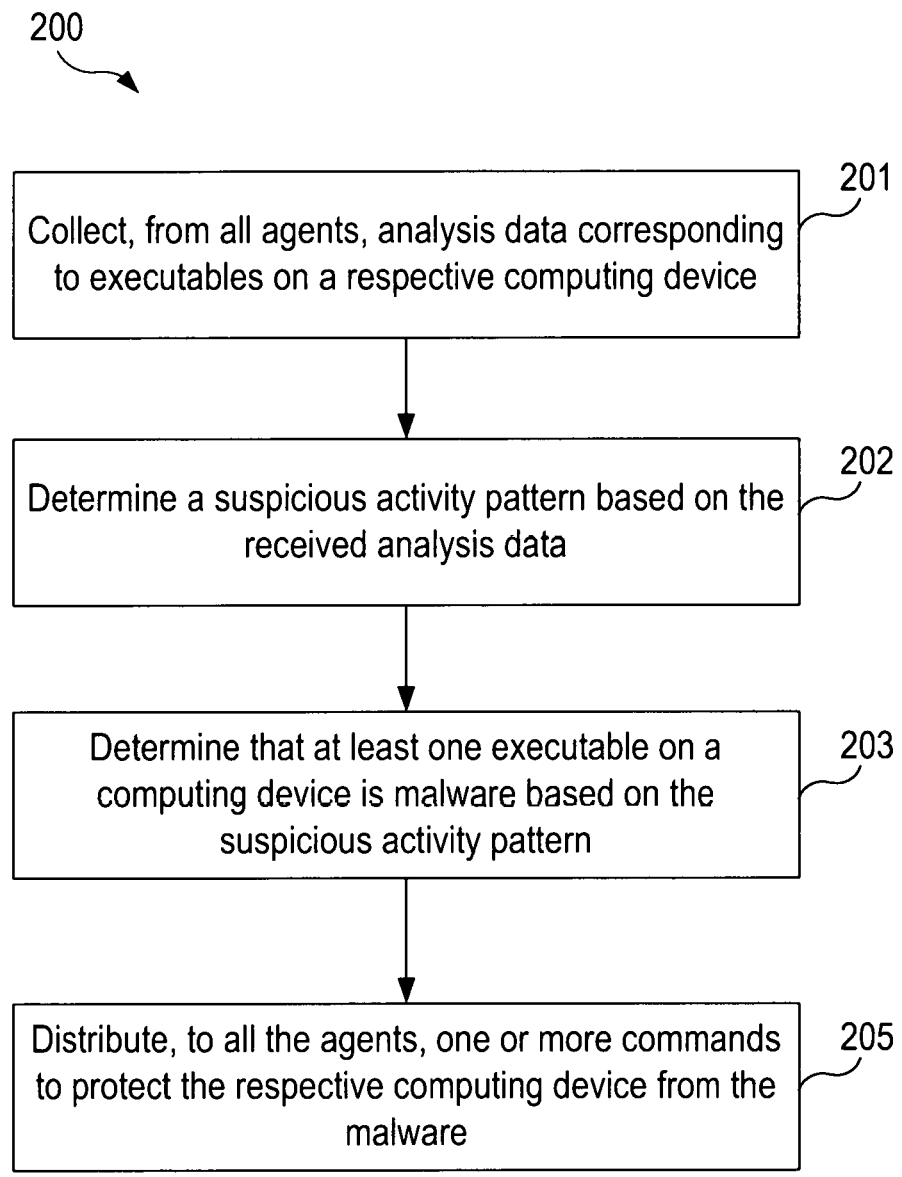
FIG. 2 is a flowchart illustrating a method for detecting malicious software executing on a plurality of computing devices according to an exemplary aspect.

FIG. 2 is a flowchart illustrating a method 200 for detecting malicious software executing on a plurality of computing devices according to an exemplary aspect. It is noted that the following description of the exemplary method makes reference to the system and components described above.

The method 200 begins at step 201, in which the cloud AI engine 112 collects from a plurality of agents 106 executing on a respective computing device 104, analysis data corresponding to executables 108 on the respective computing device. In some aspects, the executables may be user-level applications, software, or software modules, as well as kernel processes, modules, or other system modules. In some aspects, the received analysis data may include static analysis of at least one executable and dynamic analysis of the at least one executable.

At step 202, the cloud AI engine 112 determines a suspicious activity pattern based on the received analysis data. In some aspects, the cloud AI engine 112 may identify malware authors based on behavioral and distribution patterns. In some aspects, the cloud AI engine 112 may detect a malware epidemic based on previously known distribution methods. In another aspect, the cloud AI engine 112 may detect a security flaw in a user application that can be used for malware based on previously known distribution methods.

At step 203, the cloud AI engine 112 determines that at least one executable 108 on a computing device 104 is malware based on the determined suspicious activity pattern. In some aspects, the cloud AI engine 112 may identify a zero-day attack by malware not found in a database of previously known malware based on the suspicious activity pattern. In some aspects, the cloud AI engine may identify a zero-day attack by malware identified as modified from a previously known version based on the suspicious activity pattern and using a database of previously known malware.

At step 204, the cloud AI engine 112 may determine a remedial action and distribute to the plurality of agents 106 one or more commands to protect the respective computing device 104 from the malware. In cases in which the malware is identified as modified from a previously known version, the cloud AI engine 112 may determine a known remedial action for the previously known version from the database, and distribute the one or more commands comprising the known remedial action to the plurality of agents for execution on the plurality of computing devices. In an exemplary aspect, the cloud AI engine 112 may analyze the code and generate a set of new remedial steps to remedy or disinfect a client device of malware. In this aspect, the cloud AI engine 112 learns on new malware samples, defines new remedial actions and tries these actions on example client devices. The learning of the cloud AI engine 112 may be fully automated and/or may involve the help of human expects.

In some aspects, the cloud AI engine 112 may further analyze the malware and detect specific traces linked to certain persons or parties responsible for its distribution and creation. In some aspects, the cloud AI engine 112 may detect specific internet activity, access to specific IP addresses, specific distribution traces, specific code patterns, or specific behavioral patterns. The cloud AI engine 112 may compare this information to known information related to previously known or analyzed malware. In an exemplary aspect, a distribution trace refers to how a malware is distributed to devices. An agent executing on a client device may determine the path of malware appearance in the device. For example, application "A" begins executing script "B", which downloaded dropper "C" from IP address "D", which injects malicious code into application "E", which downloaded malware "F", which was detected when F begins encrypting user files. "A->B->C->D->E->F" is an example of a distribution trace. The cloud AI engine 112 may determine typical distribution patterns based on distribution traces from different client devices.

Figure 3A:
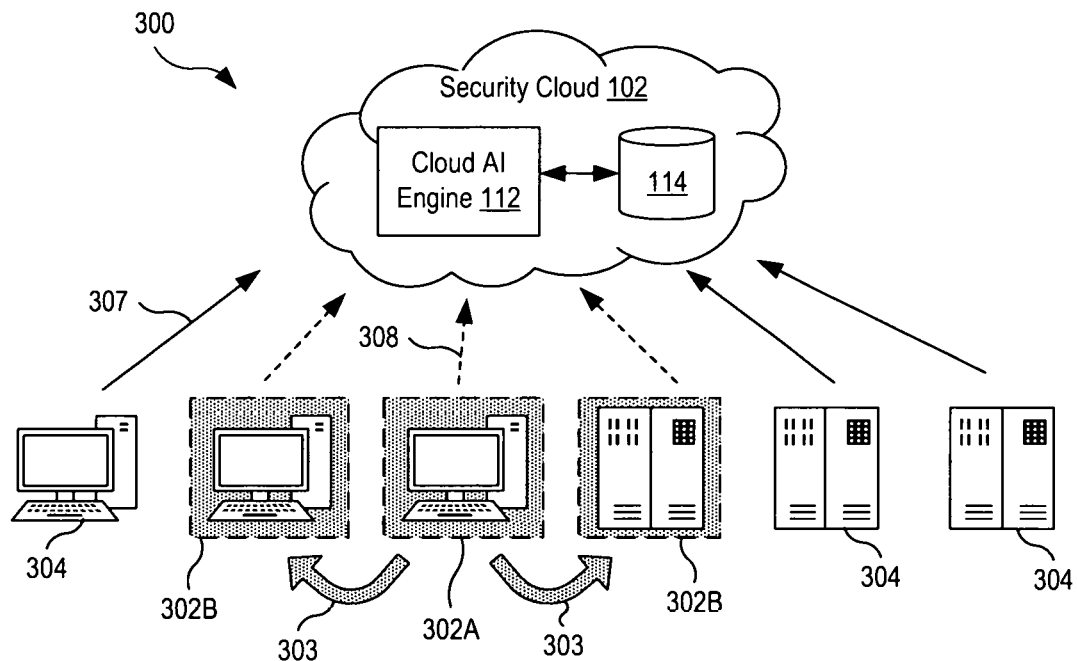
FIGS. 3A and 3B are block diagrams depicting exemplary scenarios of malware detection and prediction.
Figure 3B:
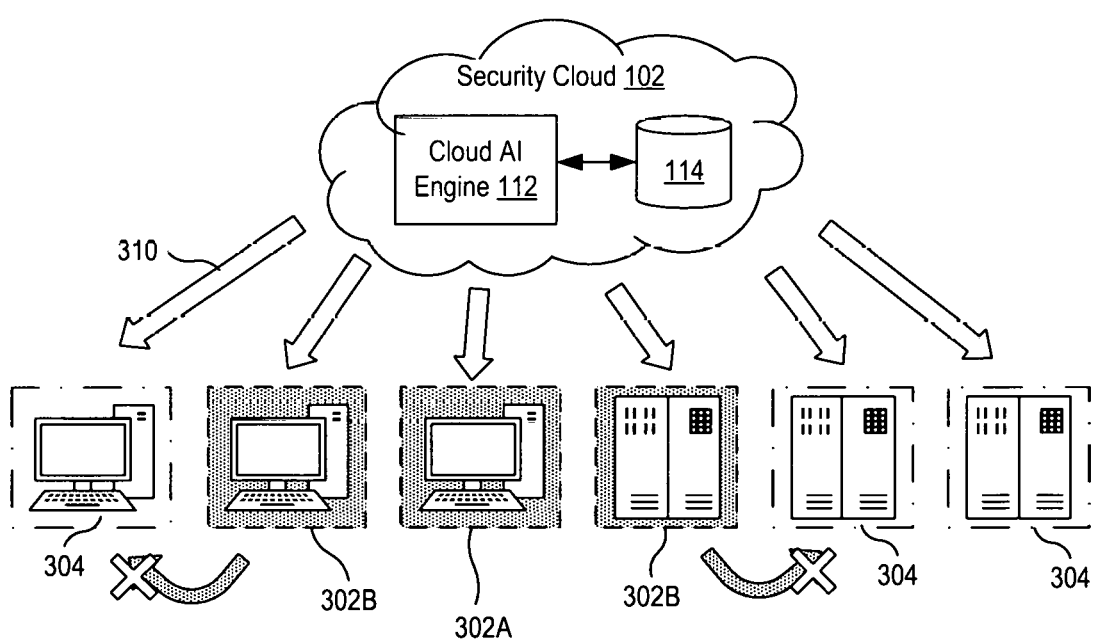

FIGS. 3A and 3B are block diagrams depicting exemplary scenarios 300 of malware detection and prediction. In the scenario 300 depicted in FIG. 3A, hackers have found a new exploit in a popular software application and create a new malware distribution prior to the exploit becoming public knowledge, i.e., a zero-day attack. The hackers start distributing the new malware, for example, to a computing device 302A. Infection by the malware is depicted in FIGS. 3A and 3B by a dashed outline and shaded background of a computing device. The malware begins infecting (303) computing devices 302B having the security agents 106 installed hereon. The security agents 106 on computing devices 302A, 302B detect suspicious activity and sends analysis data associated with the suspicious activity to the security cloud 102 (arrows 308). It is noted that during this time, security agents running on uninfected computing devices 304 may be transmitting analysis data (307) indicating a lack of malware infection.

In one aspect, the cloud AI engine 112 detects that the new suspicious activity is not similar to attacks previously known, for example, based on a comparison with historical data stored in cloud storage 114. In one aspect, the cloud AI engine 112 determines that the activity is suspicious by comparing activities on devices where the executable is not running with devices where the virus has already executed. In this aspect, a signature of devices within a corporate network indicating proper function is stored in a database that may or may not be located in the corporate network. The cloud AI engine 112 analyzes the received information about the suspicious activity and may determine that the activities appear very risky. As such, the cloud AI engine 112 determines one or more actions required to stop the new activity from spreading. In one aspect, the cloud AI engine 112 determines one of a plurality of remedial actions to be taken, such as invocation of a "kill-switch" in the malware, entering information about the malware onto a blacklist, updating the exploited executable, etc.

As shown in FIG. 3B, the cloud AI engine 112 connects to the security agents 106 worldwide and gives commands 310 used to stop the malware activity and distribution. In turn, the security agents 106 perform the action required by the cloud AI engine's commands to stop the malware distribution. As a result, a potential malware epidemic is stopped in the very beginning of its distribution across a network of computers. As shown in FIG. 3B, the computing devices 304 are no longer vulnerable to the malware, as represented by a dash-dot outline. In some aspects, the commands 310 may include instructions for how to remove an existing malware from the computing device, as in the cases for computing devices 302A, 302B. The security agents 106 may detect that the suspicious activity has stopped and reports this information back to the security cloud 102. In turn, the cloud AI engine 112 teaches itself (e.g., using machine learning techniques) based on this successful malware analysis and treatment use case.

In another example scenario, hackers might modify old malware to be undetectable by classic antivirus scanners and security applications (i.e., a zero-day attack with modified known malware). The hackers begin distribution of the modified malware, and the malware starts infecting computing devices with the security agents 106 running thereon. At least one security agent 106 detects suspicious activity and sends information about it to the security cloud 102. The security cloud 102 analyzes the received information, including detecting that the new activity is similar to known activity which was previously detected. The cloud AI engine 112 may select the best solution to stop this new activity and sends appropriate commands to agents 106 worldwide. The agents worldwide perform the action(s) required by the cloud AI engine's commands to stop malware distribution. As a result, as in scenario 300, a potential malware epidemic is stopped in the very beginning.

In some aspects, the cloud AI engine 112 may further analyze the malware and detect specific traces linked to certain persons or parties responsible for its distribution and creation. For example, the cloud AI engine 112 detect specific internet activity, access to specific IP addresses, specific distribution traces, specific code patterns, or specific behavioral patterns. Based on this information, the cloud AI engine 112 may generate a report specifying a probable, suspect party responsible for the creation and/or distribution of the malware (which may be passed on to the authorities). In some cases, the authorities might check on the cloud AI engine's guess and find the hackers, which results in the malware distribution team being prosecuted and arrested.

In another example scenario, the cloud AI engine 112 may prevent possible exploitation of software on the computing devices 104. For example, software (e.g., executables 108) on a client computing device 104 may contain a critical security flaw. In some cases, some non-critical malware, hacker application, or even a normal user application may accidentally trigger or intentionally utilize this exploit. The security agents 106 may collect information about software behavior on the respective computing device and sends the information to the security cloud 102. Similar to the above scenarios, the cloud AI engine 112 analyzes the received information by analyzing the suspicious activity and determining whether the suspicious activity is correlated with a security hole. The cloud AI engine 112 may generate any possible commands to prevent further exploitation of the security flaw and sends these commands to agents worldwide. The security agents 106 worldwide may perform the action(s) requested by the cloud's commands to prevent exploitation of the security hole. As a result, the security hole is detected before it was taken advantage of by malware and distributed to other computing devices, and a possible malware epidemic is prevented.

In another aspect of the present disclosure, the cloud AI engine 112 may be configured to improve the AI for better detection of new malware. The cloud AI engine 112 may collect information about suspicious activity on agents worldwide. The cloud AI engine 112 may further collect information about successfully detected and blocked malware, i.e., successful test cases. The cloud AI engine 112 collects information about false positive and false negative detections, as well. Based on this information, the cloud AI engine 112 teaches itself and the agents 106 for better detection of new malware. As a result, the cloud AI engine 112 is able to teach and improve detection of malware and generation of remedial actions over time.

Figure 4:
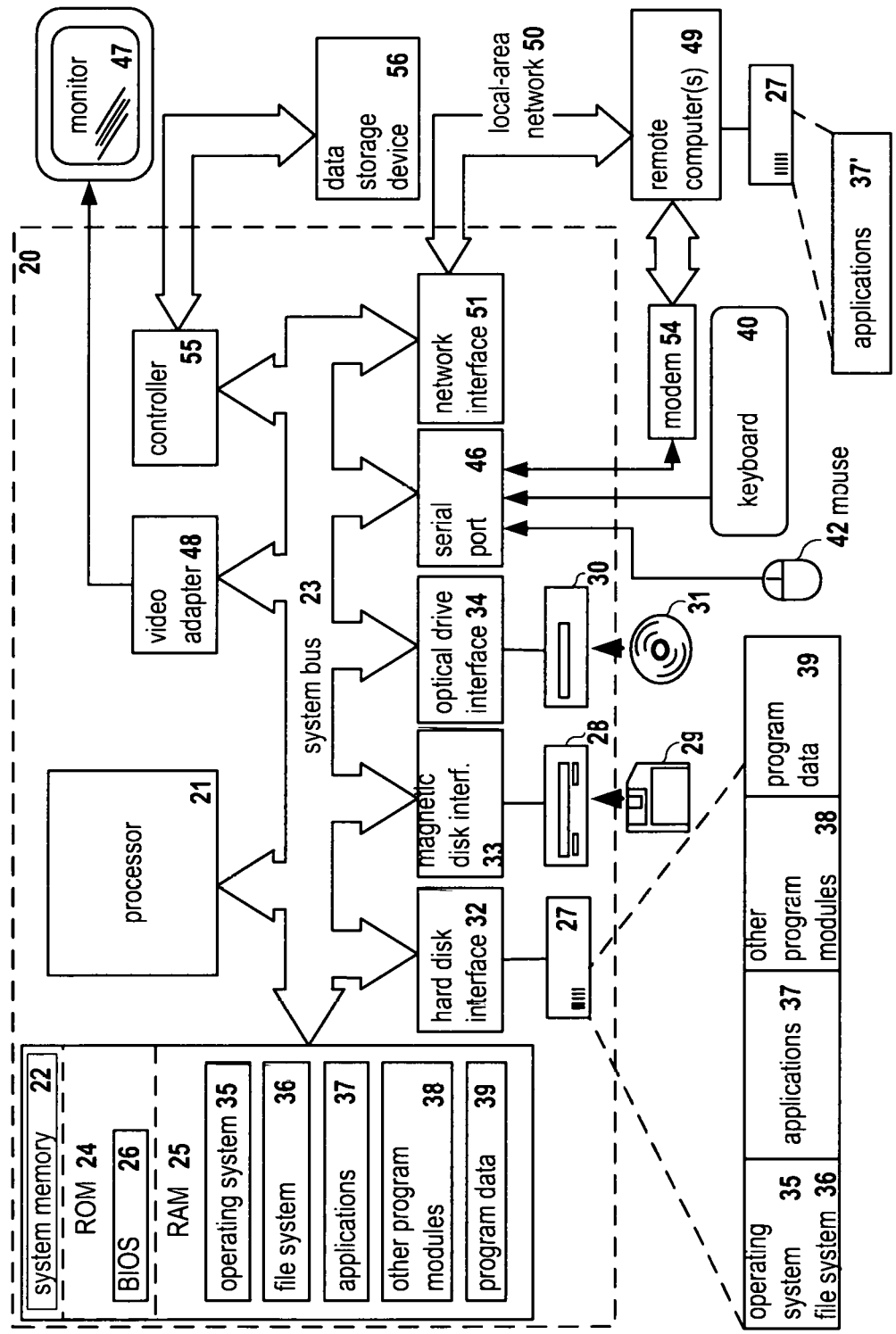
FIG. 4 is a block diagram of a general-purpose computer system on which the disclosed system and method can be implemented according to an exemplary aspect.

FIG. 4 is a block diagram illustrating a general-purpose computer system 20 on which aspects of systems and methods for a cloud-based artificial intelligence (AI) engine for malware analysis and attack prediction may be implemented in accordance with an exemplary aspect. It should be noted that the computer system 20 can correspond to the computing devices 104, or computing devices that implement the security cloud 102, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for detecting malicious software executing on a plurality of computing devices, wherein the method comprises:
    collecting, by a hardware processor, from a plurality of agents each executing on a respective computing device of a plurality of computing devices, analysis data corresponding to executables on the plurality of computing devices;
    determining, by the hardware processor, a suspicious activity pattern based on the received analysis data;
    identifying, based on the suspicious activity pattern, a zero-day attack associated with at least one executable on a subset of the computing devices, wherein the zero-day attack is conducted by malware not found in a database of previously known malware, wherein the database includes remedial actions for the previously known malware;
    generating, by the hardware processor, a new remedial action for protecting against the zero-day attack; and
    subsequent to testing that the new remedial action protects against the zero-day attack on example computing devices, distributing by the hardware processor, the new remedial action to the plurality of computing devices.

2. The method of claim 1, wherein determining the suspicious activity pattern based on the received analysis data further comprises:
    identifying malware authors based on behavioral and distribution patterns.

3. The method of claim 1, wherein determining the suspicious activity pattern based on the received analysis data further comprises:
    detecting a malware epidemic based on previously known distribution methods.

4. The method of claim 1, wherein determining the suspicious activity pattern based on the received analysis data further comprises:
    detecting a security flaw in a user application that can be used for malware based on previously known distribution methods.

5. The method of claim 1, wherein the received analysis data comprises static analysis of at least one executable and dynamic analysis of the at least one executable.

6. The method of claim 1, further comprising:
    identifying a zero-day attack by malware by determining the malware is modified from a previously known version on the malware based on the suspicious activity pattern and using a database of previously known malware;
    determining a known remedial action for the previously known version from the database, the known remedial action comprising one or more commands; and
    distributing the known remedial action to the plurality of agents for execution of the one or more commands on the plurality of computing devices.

7. A cloud-based system for detecting malicious software executing on a plurality of computing devices, wherein the system comprises:
    a database for storing information associated with previously-known malware; and
    a hardware processor configured to:
        collect, from a plurality of agents each executing on a respective computing device of a plurality of computing devices, analysis data corresponding to executables on the plurality of computing devices;
        determine a suspicious activity pattern based on the received analysis data;
        identify, based on the suspicious activity pattern, a zero-day attack associated with at least one executable on a subset of the computing devices, wherein the zero-day attack is conducted by malware not found in a database of previously known malware, wherein the database includes remedial actions for the previously known malware;
        generate a new remedial action for protecting against the zero-day attack; and subsequent to testing that the new remedial action protects against the zero-day attack on example computing devices, distribute the new remedial action to the plurality of computing devices.

8. The system of claim 7, wherein the hardware processor configured to determine the suspicious activity pattern based on the received analysis data is further configured to:
identify malware authors based on behavioral and distribution patterns.

9. The system of claim 7, wherein the hardware processor configured to determine the suspicious activity pattern based on the received analysis data is further configured to:
detect a malware epidemic based on previously known distribution methods.

10. The system of claim 7, wherein the hardware processor configured to determine the suspicious activity pattern based on the received analysis data is further configured to:
detect a security flaw in a user application that can be used for malware based on previously known distribution methods.

11. The system of claim 7, wherein the received analysis data comprises static analysis of at least one executable and dynamic analysis of the at least one executable.

12. The system of claim 7, wherein the hardware processor is further configured to:
identify a zero-day attack by malware by determining the malware is modified from a previously known version on the malware based on the suspicious activity pattern and using a database of previously known malware;
determine a known remedial action for the previously known version from the database, the known remedial action comprising one or more commands; and
distribute the known remedial action to the plurality of agents for execution of the one or more commands on the plurality of computing devices.

13. A non-transitory computer readable medium comprising computer executable instructions for detecting malicious software executing on a plurality of computing devices, the instructions comprising:
collecting, from a plurality of agents each executing on a respective computing device of a plurality of computing devices, analysis data corresponding to executables on the plurality of computing devices;
determining a suspicious activity pattern based on the received analysis data;
identifying, based on the suspicious activity pattern, a zero-day attack associated with at least one executable on a subset of the computing devices, wherein the zero-day attack is conducted by malware not found in a database of previously known malware, wherein the database includes remedial actions for the previously known malware;
generating a new remedial action for protecting against the zero-day attack; and
subsequent to testing that the new remedial action protects against the zero-day attack on example computing devices, distribute the new remedial action to the plurality of computing devices.

14. The non-transitory computer readable medium of claim 13, wherein the instructions for determining the suspicious activity pattern based on the received analysis data further comprises instructions for:
identifying malware authors based on behavioral and distribution patterns.

15. The non-transitory computer readable medium of claim 13, wherein the instructions for determining the suspicious activity pattern based on the received analysis data further comprises instructions for:
detecting a malware epidemic based on previously known distribution methods.

16. The non-transitory computer readable medium of claim 13, wherein the instructions for determining the suspicious activity pattern based on the received analysis data further comprises instructions for:
detecting a security flaw in a user application that can be used for malware based on previously known distribution methods.

17. The non-transitory computer readable medium of claim 13, further comprising instructions for:
identifying a zero-day attack by malware by determining the malware is modified from a previously known version on the malware based on the suspicious activity pattern and using a database of previously known malware;
determining a known remedial action for the previously known version from the database, the known remedial action comprising one or more commands; and
distributing the known remedial action to the plurality of agents for execution of the one or more commands on the plurality of computing devices.

* * * * *